(12) United States Patent
Cao et al.

(10) Patent No.: US 12,354,087 B2
(45) Date of Patent: Jul. 8, 2025

(54) DYNAMIC PAYMENT AUTHORIZATION SYSTEM AND METHOD

(71) Applicant: RAKUTEN GROUP, INC., Tokyo (JP)

(72) Inventors: Rong Cao, Tokyo (JP); Takayuki Kurihara, Tokyo (JP); Shigetaka Arimura, Tokyo (JP); Yuzo Takahashi, Tokyo (JP); Kazuaki Ban, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/922,050

(22) PCT Filed: Jul. 28, 2022

(86) PCT No.: PCT/US2022/038637
§ 371 (c)(1),
(2) Date: Oct. 28, 2022

(87) PCT Pub. No.: WO2024/025533
PCT Pub. Date: Feb. 1, 2024

(65) Prior Publication Data
US 2024/0220971 A1    Jul. 4, 2024

(51) Int. Cl.
*G06Q 20/38*  (2012.01)
*G06Q 20/02*  (2012.01)

(52) U.S. Cl.
CPC ....... *G06Q 20/3825* (2013.01); *G06Q 20/027* (2013.01)

(58) Field of Classification Search
CPC ...................................... G06Q 40/00
USPC ........................................... 705/35
See application file for complete search history.

(56) References Cited

U.S. PATENT DOCUMENTS

| 5,297,032 A * | 3/1994 | Trojan | G06Q 40/04 705/37 |
| 5,761,442 A * | 6/1998 | Barr | G06Q 40/06 705/36 R |
| 5,774,553 A * | 6/1998 | Rosen | G06Q 20/381 705/37 |

(Continued)

OTHER PUBLICATIONS

International Search Report dated Nov. 1, 2022, issued in International Application No. PCT/US2022/038637.

(Continued)

*Primary Examiner* — Kirsten S Apple
(74) *Attorney, Agent, or Firm* — Sughrue Mion, PLLC (57) ABSTRACT

A method of transaction authorization includes receiving, by a payment gateway of a payment platform and from a business support system (BSS), an authorization request for a transaction and a security token corresponding to credential information, determining, by the payment gateway, whether an authorization for the transaction is required, and, based on determining that an authorization for the transaction is not required, generating, by the payment gateway, a capture request for retrieving funds for the transaction, sending, by the payment gateway, the capture request to a card issuer corresponding to the credential information, and transferring, by the payment gateway, the funds for the transaction to an operator of the payment gateway.

14 Claims, 4 Drawing Sheets

(56) References Cited

U.S. PATENT DOCUMENTS

| | | | | |
|---|---|---|---|---|
| 5,812,988 A * | 9/1998 | Sandretto | G06Q 40/00 |
| | | | 702/179 |
| 6,014,645 A * | 1/2000 | Cunningham | G06Q 40/00 |
| | | | 235/379 |
| 6,058,379 A * | 5/2000 | Odom | G06Q 40/04 |
| | | | 705/37 |
| 6,313,833 B1 * | 11/2001 | Knight | G06Q 40/06 |
| | | | 705/37 |
| 6,345,090 B1 * | 2/2002 | Walker | G06Q 40/04 |
| | | | 379/114.03 |
| 6,912,510 B1 * | 6/2005 | Shepherd | G06Q 40/04 |
| | | | 705/37 |
| 6,954,758 B1 * | 10/2005 | O'Flaherty | G06Q 30/02 |
| | | | 707/999.102 |
| 7,165,037 B2 * | 1/2007 | Lazarus | G06Q 30/0269 |
| | | | 705/7.31 |
| 7,376,431 B2 * | 5/2008 | Niedermeyer | G07C 9/22 |
| | | | 379/189 |
| 8,104,678 B2 * | 1/2012 | Yoshikawa | G06Q 20/4037 |
| | | | 235/492 |
| RE43,435 E * | 5/2012 | Krause | G06Q 40/06 |
| | | | 705/37 |
| 8,234,201 B1 * | 7/2012 | Canabarro | G06Q 40/06 |
| | | | 705/36 R |
| 8,412,605 B2 * | 4/2013 | Griffin | G06Q 40/02 |
| | | | 705/76 |
| 11,720,887 B1 * | 8/2023 | Arvanaghi | G06Q 20/3676 |
| | | | 705/64 |
| 2002/0161677 A1 * | 10/2002 | Zumbach | G06Q 40/00 |
| | | | 707/E17.001 |
| 2002/0184134 A1 * | 12/2002 | Olsen | G06Q 40/06 |
| | | | 705/37 |
| 2003/0149648 A1 * | 8/2003 | Olsen | G06Q 40/00 |
| | | | 705/35 |
| 2004/0111358 A1 * | 6/2004 | Lange | G07F 17/32 |
| | | | 705/37 |
| 2005/0187854 A1 * | 8/2005 | Cutler | G06Q 40/04 |
| | | | 705/37 |
| 2005/0192899 A1 * | 9/2005 | Reardon | G06Q 40/00 |
| | | | 705/40 |
| 2005/0283422 A1 * | 12/2005 | Myr | G06Q 30/08 |
| | | | 705/37 |
| 2007/0244795 A1 * | 10/2007 | Lutnick | G06Q 40/04 |
| | | | 705/37 |
| 2008/0301019 A1 * | 12/2008 | Monk | G06Q 20/4016 |
| | | | 705/35 |
| 2010/0023460 A1 * | 1/2010 | Hughes | G06Q 40/06 |
| | | | 705/36 R |
| 2010/0076906 A1 * | 3/2010 | Eubank | G06Q 40/06 |
| | | | 705/37 |
| 2010/0312701 A1 * | 12/2010 | Bosch | G07F 19/20 |
| | | | 705/43 |
| 2011/0145149 A1 * | 6/2011 | Valdes | G06Q 20/102 |
| | | | 705/44 |
| 2011/0178912 A1 * | 7/2011 | Parsons | G06Q 40/00 |
| | | | 705/35 |
| 2011/0264581 A1 * | 10/2011 | Clyne | G06Q 20/10 |
| | | | 705/39 |
| 2012/0029956 A1 * | 2/2012 | Ghosh | G06Q 10/063 |
| | | | 705/7.11 |
| 2012/0259762 A1 * | 10/2012 | Tarighat | G06F 8/34 |
| | | | 705/37 |
| 2012/0278254 A1 * | 11/2012 | Rosenthal | G06Q 40/06 |
| | | | 705/36 R |
| 2012/0323764 A1 * | 12/2012 | Boberski | G06Q 40/04 |
| | | | 705/39 |
| 2013/0218657 A1 * | 8/2013 | Salmon | G06Q 30/0215 |
| | | | 705/14.29 |
| 2013/0226764 A1 * | 8/2013 | Battyani | G06Q 40/04 |
| | | | 705/37 |
| 2013/0262317 A1 | 10/2013 | Collinge et al. | |
| 2013/0282549 A1 * | 10/2013 | Howorka | G06Q 40/04 |
| | | | 705/37 |
| 2014/0156491 A1 * | 6/2014 | Koh | G06Q 40/04 |
| | | | 705/37 |
| 2014/0229353 A1 * | 8/2014 | Lutnick | G06Q 40/04 |
| | | | 705/37 |
| 2015/0095225 A1 * | 4/2015 | Appana | G06Q 20/227 |
| | | | 705/41 |
| 2017/0270517 A1 | 9/2017 | Vasu et al. | |
| 2019/0114627 A1 * | 4/2019 | Tang | G06Q 20/00 |
| 2020/0250644 A1 * | 8/2020 | Oberholtzer | G06Q 20/027 |
| 2021/0065142 A1 * | 3/2021 | Batra | G06F 9/541 |
| 2021/0125176 A1 * | 4/2021 | Yun | G06Q 20/3676 |

OTHER PUBLICATIONS

Written Opinion dated Nov. 1, 2022, issued in International Application No. PCT/US2022/038637.

"Frictionless Flow", 3DSecure2, May 22, 2022, pp. 1-7 (14 pages total), URL: https://web.archive.org/web/20220522130651/https://3dsecure2.com/jp/frictionless-flow/.

* cited by examiner

DYNAMIC PAYMENT AUTHORIZATION SYSTEM AND METHOD

This application is a National Stage of International Application No. PCT/US2022/038637 filed Jul. 28, 2022

BACKGROUND

1. Field

Apparatuses and methods consistent with example embodiments of the present disclosure relate to payment authorization systems.

2. Description of Related Art

Generally, a credit/debit card transaction may include an authorization stage (authorizing the transaction) and a capture stage (retrieving/exchanging funds for the transactions). Mobile users may have an option to use credit/debit card transactions for a recurring or one-time payment (e.g., a bill payment). When a user adds a card for the payment, the user may submit the card details to the mobile operator, and the mobile operator may store the card details in a storage device. When a payment is required, the mobile operator may send a capture request, along with the card details, to the card company (i.e., a company that issued the card). The card company may authorize the transaction and the capture request. Upon successful authorization, the card company may request the card host (i.e., a bank account) to deduct the requested amount of money from the user's account and to transfer the requested amount of funds to the mobile operator.

However, when the number of users increases, the number of capture requests (fund requests) increases, causing a large authorization processing cost and high resource consumption. Thus, a risk of data leakage of the card information stored on the storage device may occur.

SUMMARY

According to embodiments, systems and methods are provided for allowing a user to configured conditions of payment authorization, such that a number of authorization requests for transactions may be reduced.

According to an aspect of the disclosure, a method of transaction authorization may include receiving, by a payment gateway of a payment platform and from a business support system (BSS), an authorization request for a transaction and a security token corresponding to credential information, determining, by the payment gateway, whether an authorization for the transaction is required, and, based on determining that an authorization for the transaction is not required, generating, by the payment gateway, a capture request for retrieving funds for the transaction, sending, by the payment gateway, the capture request to a card issuer corresponding to the credential information, and transferring, by the payment gateway, the funds for the transaction to an operator of the payment gateway.

According to an aspect of the disclosure, a system for transaction authorization may include a memory storing instructions, and at least one processor configured to execute the instructions to receive, by a payment gateway of a payment platform and from a BSS, an authorization request for a transaction and a security token corresponding to credential information, determine, by the payment gateway, whether an authorization for the transaction is required, and, based on determining that an authorization for the transaction is not required, generate, by the payment gateway, a capture request for retrieving funds for the transaction, send, by the payment gateway, the capture request to a card issuer corresponding to the credential information, and transfer, by the payment gateway, the funds for the transaction to an operator of the payment gateway.

According to an aspect of the disclosure, a non-transitory computer-readable storage medium may store instructions that, when executed by at least one processor, cause the at least one processor to receive, by a payment gateway of a payment platform and from a BSS, an authorization request for a transaction and a security token corresponding to credential information, determine, by the payment gateway, whether an authorization for the transaction is required, and, based on determining that an authorization for the transaction is not required, generate, by the payment gateway, a capture request for retrieving funds for the transaction, send, by the payment gateway, the capture request to a card issuer corresponding to the credential information, and transfer, by the payment gateway, the funds for the transaction to an operator of the payment gateway.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 1:
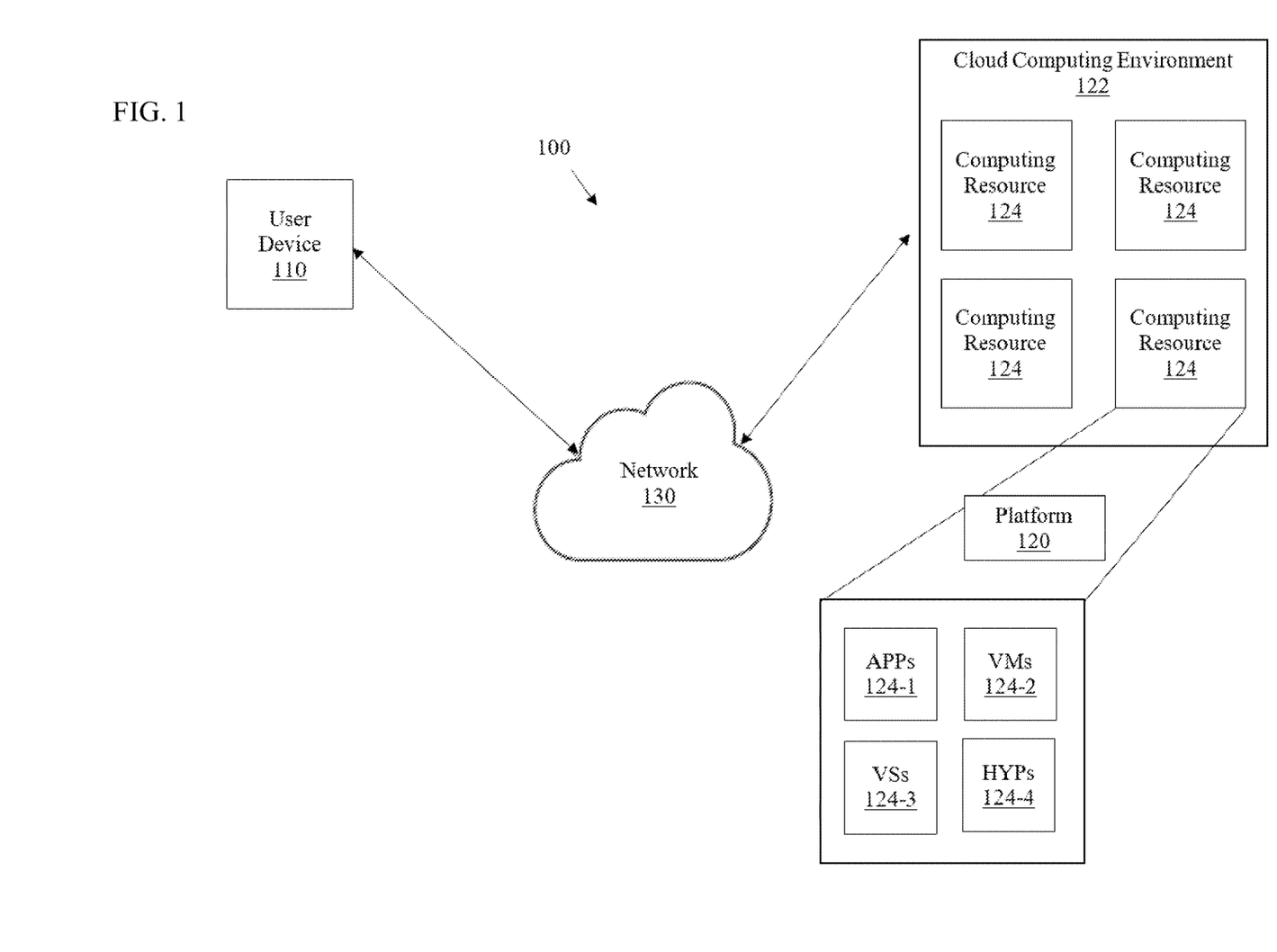
FIG. 1 is a diagram of an example environment in which systems and/or methods, described herein, may be implemented.

FIG. 1 is a diagram of an example environment 100 in which systems and/or methods, described herein, may be implemented. As shown in FIG. 1, environment 100 may include a user device 110, a platform 120, and a network 130. Devices of environment 100 may interconnect via wired connections, wireless connections, or a combination of wired and wireless connections. In embodiments, any of the functions and operations described with reference to FIG. 1 above may be performed by any combination of elements illustrated in FIG. 1.

User device 110 includes one or more devices capable of receiving, generating, storing, processing, and/or providing information associated with platform 120. For example, user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 110 may receive information from and/or transmit information to platform 120.

Platform 120 includes one or more devices capable of receiving, generating, storing, processing, and/or providing information. In some implementations, platform 120 may include a cloud server or a group of cloud servers. In some implementations, platform 120 may be designed to be modular such that certain software components may be swapped in or out depending on a particular need. As such, platform 120 may be easily and/or quickly reconfigured for different uses.

In some implementations, as shown, platform 120 may be hosted in cloud computing environment 122. Notably, while implementations described herein describe platform 120 as being hosted in cloud computing environment 122, in some implementations, platform 120 may not be cloud-based (i.e., may be implemented outside of a cloud computing environment) or may be partially cloud-based.

Cloud computing environment 122 includes an environment that hosts platform 120. Cloud computing environment 122 may provide computation, software, data access, storage, etc. services that do not require end-user (e.g., user device 110) knowledge of a physical location and configuration of system(s) and/or device(s) that hosts platform 120. As shown, cloud computing environment 122 may include a group of computing resources 124 (referred to collectively as "computing resources 124" and individually as "computing resource 124").

Computing resource 124 includes one or more personal computers, a cluster of computing devices, workstation computers, server devices, or other types of computation and/or communication devices. In some implementations, computing resource 124 may host platform 120. The cloud resources may include compute instances executing in computing resource 124, storage devices provided in computing resource 124, data transfer devices provided by computing resource 124, etc. In some implementations, computing resource 124 may communicate with other computing resources 124 via wired connections, wireless connections, or a combination of wired and wireless connections.

As further shown in FIG. 1, computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

Application 124-1 includes one or more software applications that may be provided to or accessed by user device 110. Application 124-1 may eliminate a need to install and execute the software applications on user device 110. For example, application 124-1 may include software associated with platform 120 and/or any other software capable of being provided via cloud computing environment 122. In some implementations, one application 124-1 may send/receive information to/from one or more other applications 124-1, via virtual machine 124-2.

Virtual machine 124-2 includes a software implementation of a machine (e.g., a computer) that executes programs like a physical machine. Virtual machine 124-2 may be either a system virtual machine or a process virtual machine, depending upon use and degree of correspondence to any real machine by virtual machine 124-2. A system virtual machine may provide a complete system platform that supports execution of a complete operating system ("OS"). A process virtual machine may execute a single program, and may support a single process. In some implementations, virtual machine 124-2 may execute on behalf of a user (e.g., user device 110), and may manage infrastructure of cloud computing environment 122, such as data management, synchronization, or long-duration data transfers.

Virtualized storage 124-3 includes one or more storage systems and/or one or more devices that use virtualization techniques within the storage systems or devices of computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored.

This may enable optimization of storage use, server consolidation, and/or performance of non-disruptive file migrations.

Hypervisor 124-4 may provide hardware virtualization techniques that allow multiple operating systems (e.g., "guest operating systems") to execute concurrently on a host computer, such as computing resource 124. Hypervisor 124-4 may present a virtual operating platform to the guest operating systems, and may manage the execution of the guest operating systems. Multiple instances of a variety of operating systems may share virtualized hardware resources.

Network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
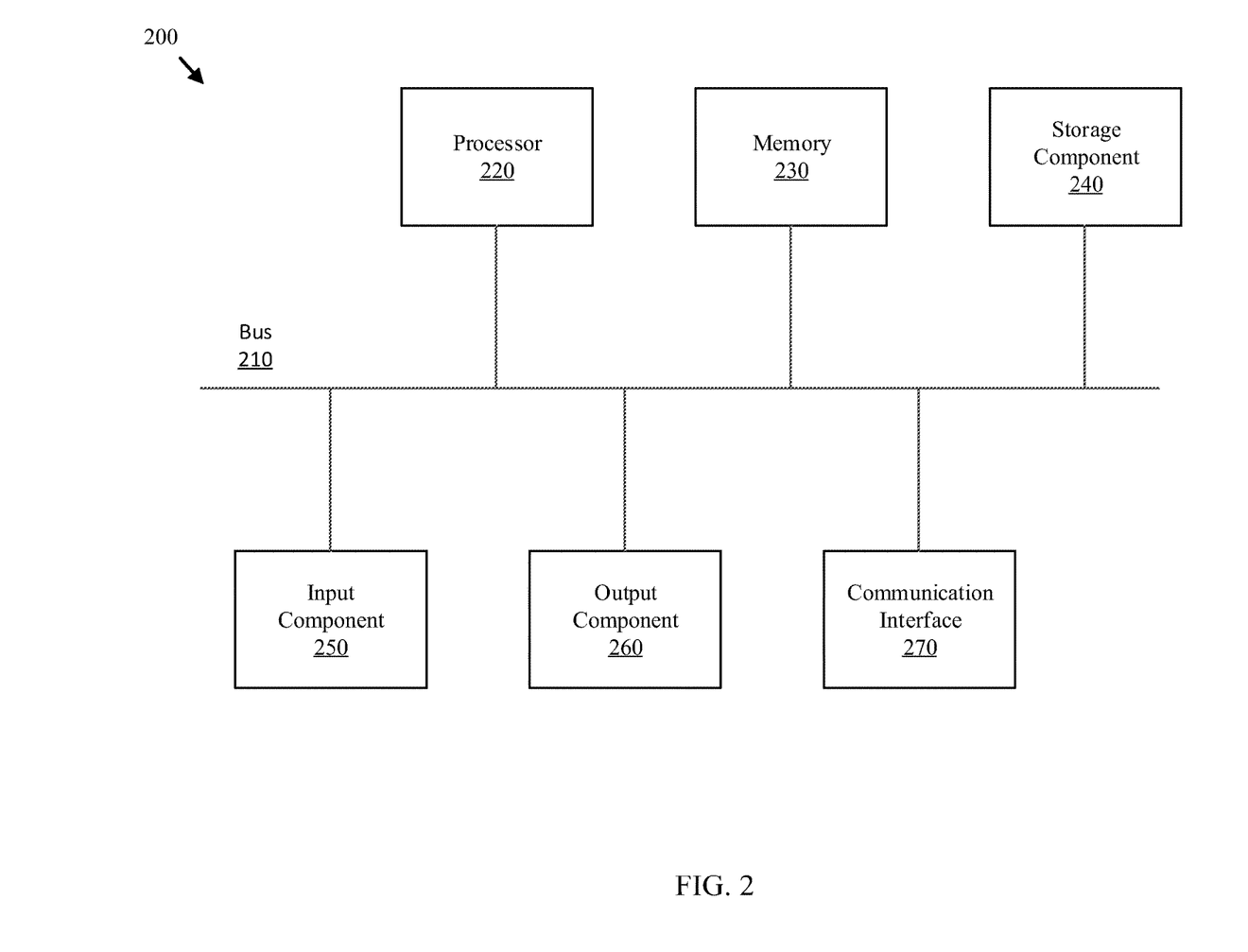
FIG. 2 is a diagram of example components of a device according to an embodiment.

FIG. 2 is a diagram of example components of a device 200. Device 200 may correspond to user device 110 and/or platform 120. As shown in FIG. 2, device 200 may include a bus 210, a processor 220, a memory 230, a storage component 240, an input component 250, an output component 260, and a communication interface 270.

Bus 210 includes a component that permits communication among the components of device 200. Processor 220 may be implemented in hardware, firmware, or a combination of hardware and software. Processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 220 includes one or more processors capable of being programmed to perform a function. Memory 230 includes a random access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of device 200. For example, storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 250 includes a component that permits device 200 to receive information, such as via user input (e.g., a touch screen display, a keyboard, a keypad, a mouse, a button, a switch, and/or a microphone). Additionally, or alternatively, input component 250 may include a sensor for sensing information (e.g., a global positioning system (GPS) component, an accelerometer, a gyroscope, and/or an actuator). Output component 260 includes a component that provides output information from device 200 (e.g., a display, a speaker, and/or one or more light-emitting diodes (LEDs)).

Communication interface 270 includes a transceiver-like component (e.g., a transceiver and/or a separate receiver and transmitter) that enables device 200 to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

Device 200 may perform one or more processes described herein. Device 200 may perform these processes in response to processor 220 executing software instructions stored by a non-transitory computer-readable medium, such as memory 230 and/or storage component 240. A computer-readable medium is defined herein as a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Example embodiments provide a system a method for allowing a user of a payment authorization platform to configure the conditions upon which payment authorization is required, such that some particular group of users will not require actual authorization (i.e., some authorization requests may be pre-authorized or the authorization step will be bypassed directly to a capture step such that the system may directly proceed to the generation of the capture request). Furthermore, the credential information (e.g., card information, user credentials, etc.) may be stored in a storage (e.g., a vault server, etc.) independent and separate from the mobile operator (i.e., when a user provides credential information to the mobile operator to be stored for future transactions, the credential information will be stored in said independent and separate storage). Thus, information security is improved, since the credential information may be stored in a storage independent from the business support system (BSS) (or also referred to as a business management system) of the mobile operator, such that the credential information is not managed by the BSS. Further, the processing burden on the card issuer in authorizing the capture requests (i.e., requests to retrieve funds from a card host, such as a bank account) may be reduced, improving the efficiency in payment processing.

Figure 3:
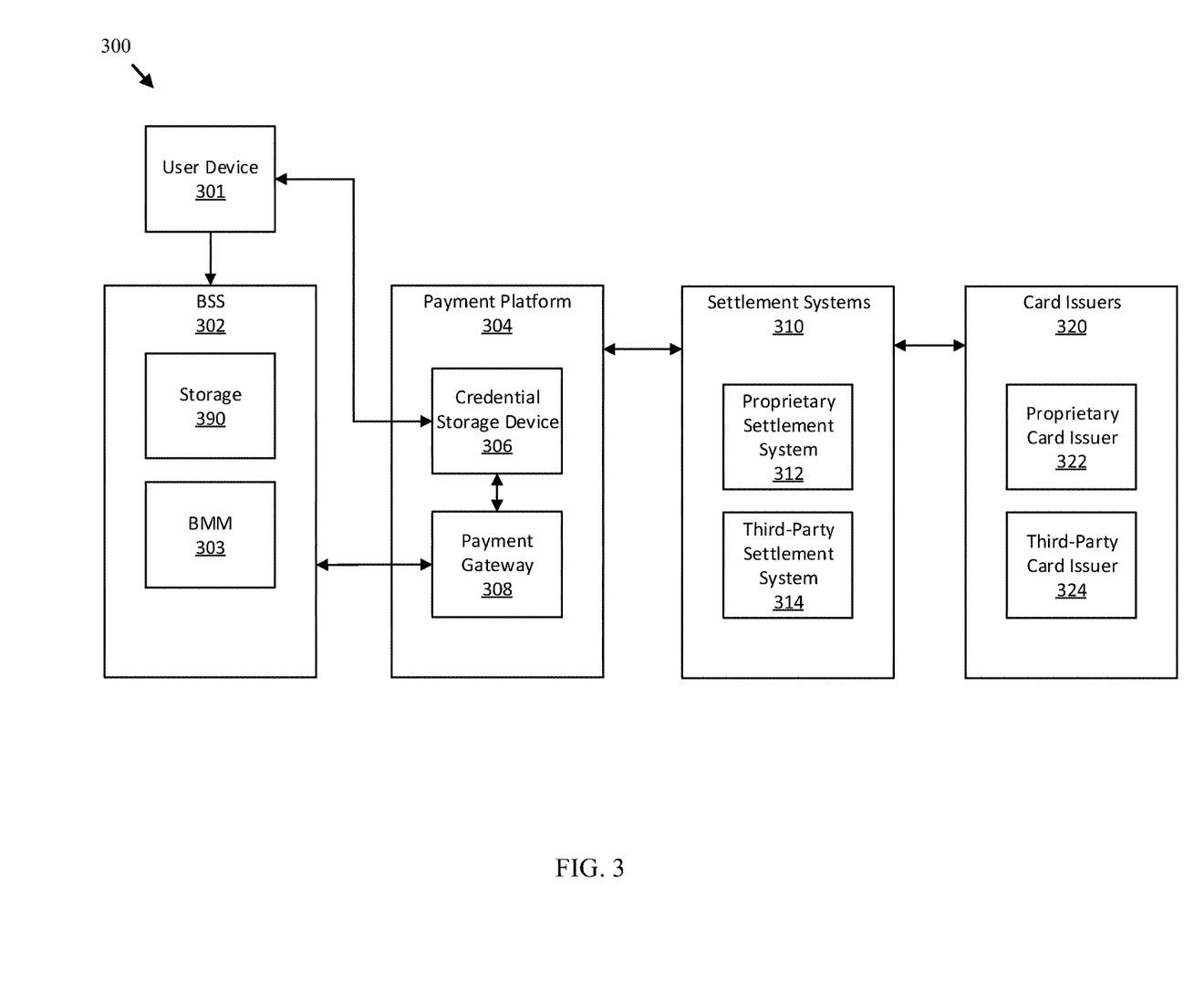
FIG. 3 is a diagram of a payment authorization system, according to an embodiment.

FIG. 3 is a diagram of a payment authorization system, according to an embodiment. The system 300 may be in communication with a user device 301. The system 300 may include a BSS 302, and a payment platform 304. The BSS 302 may include a billing management module (BMM) 303. The payment platform 304 may include a credential storage device 306 (e.g., a vault server) and a payment gateway 308. The system 300 may be in communication with settlement systems 310, including, for example, a proprietary settlement system 312 and a third-party settlement system 314. The settlement systems 310 and/or other components of system 300 may be in communication with card issuers 320, including, for example, a proprietary card issuer 322 and a third party card issuer 324. Proprietary settlement systems and proprietary card issuers may refer to settlement systems and card issuers that are of the same company, of the same partnership, or within the same operating system of the operator of system 300 (e.g., system company X may operate the system 300 while also issuing a card corresponding to system company X and operating a settlement system 312 corresponding to system company X's cards). Third party settlement systems and third party card issues may refer to settlement systems and card issuers operated by companies or system separate from, different from, or not corresponding to the system 300 (e.g., system company X may operate the system 300 while company Y issues the card being used for a transaction and operates a settlement system 314 for transactions on the cards that company Y issues).

In an example embodiment of a process for adding credential information to the system 300, a user of the user device 301 may submit a request to add credential information to the BSS 302, and the BSS 302 may present to the user via the user device 301 a user interface (UI) page for entering the credential information. The user of the user device 301 may enter the credential information (e.g., card number, expiration date, billing address, customer verification value (CVV) etc.) into the UI page, and the credential information may be sent directly to the credential storage device 306 of the payment platform 304 from the user device 301, such that the credential information is stored independently and separately from the BSS 302. The credential storage device 306 may be configured to generate a security token based on the stored credential information and provide the security token to the user device 301. In some embodiments, upon receiving a request to add credential information from a user, the BSS 302 may direct the user to the payment platform 304 and the payment platform 304 may generate a UI for entering credential info. The entered credential info may be stored directly in the credential storage device 306 of the payment platform 304. By doing so, a BSS operator will have no direct access to the credential information.

Following initiation of the credential information (i.e., the generation of the security token), to initiate the transaction, the BMM 303 of the BSS 302 may receive an authorization request and the security token from the user device 301, and may store the security token in the BSS 302 (e.g., in a storage device 390 of the BSS 302). The BSS 302 may send the authorization request and the security token to the payment gateway 308. The payment gateway 308 may generate a request to receive the credential information corresponding to the authorization request and the security token from the credential storage device 306. The payment platform 304 (i.e., via a standalone processor and/or a processor of the credential storage device 306) may determine whether the transaction requires authorization based on an authorization configuration profile associated with the credentials as well as authorization parameters set by the user (as is described in detail below). The credential storage device 306 may either provide the credential information to the payment gateway 308 if it is determined that an authorization is required, or provide an indication to the payment gateway 308 that an authorization is not required for the transaction. If an authorization is required, the payment gateway 308 may communicate with the settlement systems 310 and the card issuers 312 to resolve the transaction as will be described in detail below. If an authorization is not required, the payment gateway 308 may complete the transaction without acquiring an authorization.

In an example embodiment of a process for configuring authentication conditions, a user may be provided access to the BSS system 302. The BMM 303 of the BSS 302 may generate and present a UI to the user via the user device 301. The UI may include multiple input fields configured to receive inputs from the user for specifying the parameters for capturing request authorizations. The BSS 302 may generate a configuration profile based on the authorization parameters selected by the user.

TABLE 1

| Card Issuer | Card Type | Transaction Amount | Transaction Occurrence | Security Token Update Status | Security Token Update Result | Authorization Required |
|---|---|---|---|---|---|---|
| Card Issuer Group 1 | Credit | <30,000 Yen | Non-First | OK | Security Token Not Updated | N |
| | | | | | Security Token Updated | Y |
| | | | | NO | — | Y |
| | | | First | — | — | Y |
| | | >=30,000 Yen | — | — | — | Y |
| | Debit | — | — | — | — | Y |

TABLE 1-continued

| Card Issuer | Card Type | Transaction Amount | Transaction Occurrence | Security Token Update Status | Security Token Update Result | Authorization Required |
|---|---|---|---|---|---|---|
| Card Issuer Group 2 | — | — | — | — | — | Y |

Table 1 shows an example of a configuration profile for authorization parameters, according to an embodiment. An example parameter may include an card issuer. For example, the card may be a card issued by a first group of card issuer (e.g., an intra-company card, a proprietary card or a card issued from the mobile operator of the BSS 302, etc.) and a card issued by a second group of card issuer (e.g., an inter-company card, a card issued by a third party, etc.) An example parameter may include a type of card. For example, the type of card may be a credit card, debit card, etc. An example parameter may include a transaction amount, where a user may set a predefined transaction amount at or under which an authorization may not be required. An example parameter may include a transaction occurrence frequency. For example, a user may set a particular transaction to require authorization at a first time the transaction occurs, and then no longer require authorization for subsequent times the transaction occurs (e.g., non-first occurrences of the transaction). An example parameter may include a security token update status. For example, a user may require an authorization when a security token update fails. A security token update may include an updated token based on updated credential information. An example parameter may include a security token update result. For example, a user may require a transaction to be authorized when the security token is updated. In the example shown in Table 1, a user has configured the system to not require authorization when the issuer card is intra-company, when the card is a credit card, when the amount of the transaction is less than 30,000 yen, when an authorization for the transaction has previous occurred, when the last card updated properly, and when the update did not result in a security token update.

In another example embodiment of a process for authorizing a payment (e.g., a monthly billing payment to the mobile operator), when the payment is required, the BMM 303 may send an authorization request including the security token to the payment gateway 308 of the payment platform 304. The payment gateway 308 may send the security token to the credential storage device 306 to receive the credential information for the transaction. Upon receiving the credential information for the transaction, the payment gateway 308 may acquire an authorization configuration profile (e.g., a profile such as Table 1) from a storage (e.g., from a storage of the user device 301, a storage of the BMM 302, from the credential storage device 306, etc.), and determine, based on the credential information and the authorization configuration profile, whether an authorization is required.

If authorization is not required, the payment gateway 308 may generate, based on the credential information, a capture request and send the capture request to the card issuer 320. Upon receiving the capture request, the card issuer 320 may accept the amount requested in the capture request and request the card host (e.g., a bank account) to deduct the requested amount of money for the transaction from the user's bank account and to transfer the requested amount to the mobile operator (e.g., the operator of the BMM 302 and the payment platform 304).

If authorization is required, the payment gateway 308 may generate, based on the credential information, a formal authorization request and a formal capture request, and send the requests to the card issuer 320 (the payment gateway 308 may determine the corresponding card issuer based on the credential information). The payment gateway 308 may send the formal authorization request and formal capture request to the settlement system 310 of a corresponding card company (e.g., a proprietary card company 312, a third party card company 314, etc.). The payment gateway 308 may determine the card company based on a service ID provided by the BSS 302 with the authorization request and the security token. The settlement system 310 may forward the service ID to the card issuer 320. The card issuer 320 may authorize the transaction and capture request based on the provided credential information and information stored on the card issuer 320 system. The card issuer 320 may send a notification indicating the results of the authorization (e.g., success, failure, timeout, pending, etc.) to the user device 301 via the payment gateway 308.

Figure 4:
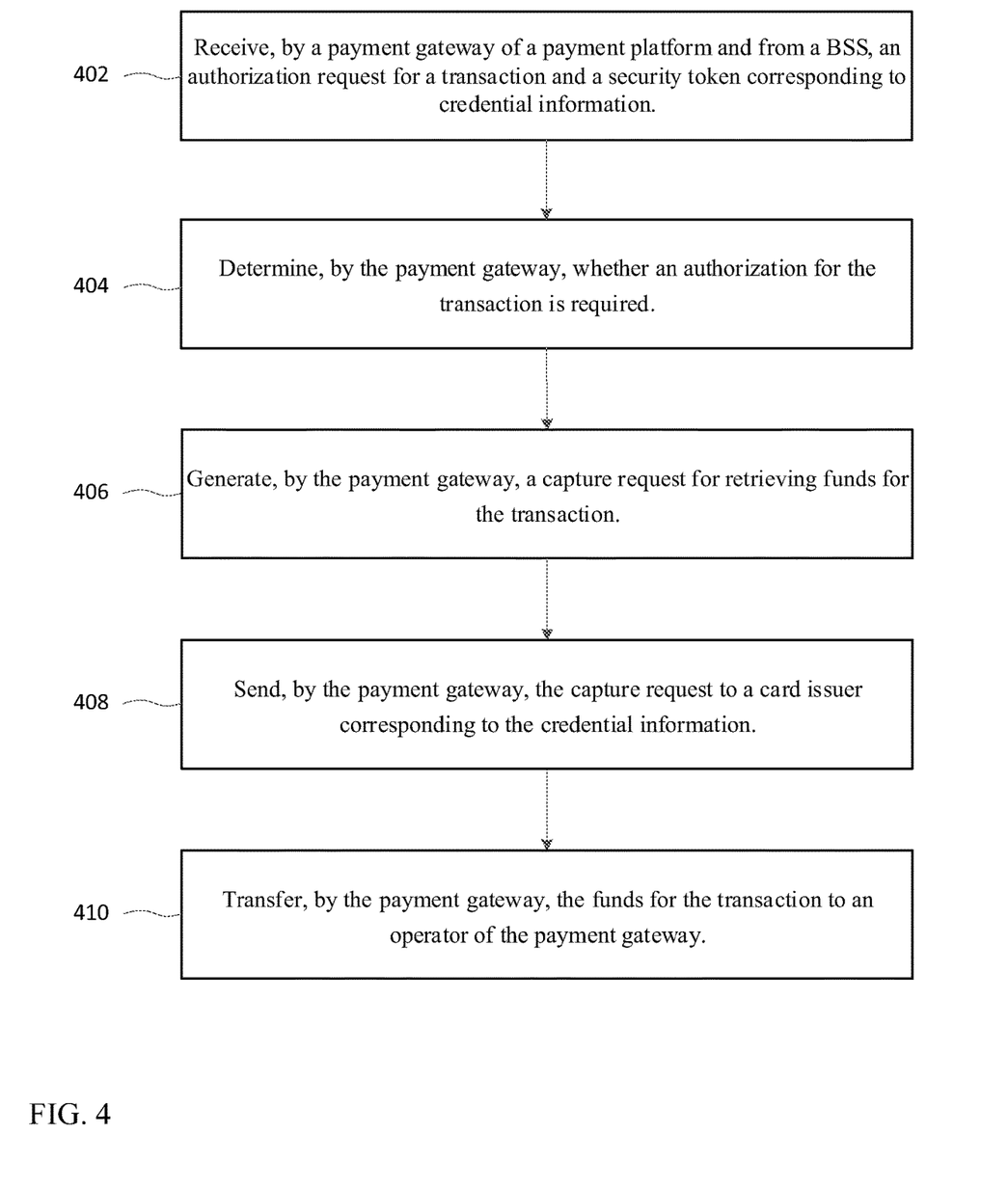
FIG. 4 is a flowchart of a method of transaction authorization, according to an embodiment.

FIG. 4 is a flowchart of a method of transaction authorization, according to an embodiment. In operation 402, the system may receive, by a payment gateway of a payment platform and from a BSS, an authorization request for a transaction and a security token corresponding to credential information. In operation 404, the system may determine, by the payment gateway, whether an authorization for the transaction is required. Based on determining that an authorization for the transaction is not required, in operation 406, the system may generate, by the payment gateway, a capture request for retrieving funds for the transaction, in operation 408, the system may send, by the payment gateway, the capture request to a card issuer corresponding to the credential information, and in operation 410, the system may transfer, by the payment gateway, the funds for the transaction to an operator of the payment gateway.

In embodiments, any one of the operations or processes of FIGS. 3-4 may be implemented by or using any one of the elements illustrated in FIGS. 1 and 2.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of transaction authorization, comprising:
receiving, by a business support system (BSS), credential information of a user;
sending, by the BSS, the credential information directly to a credential storage device of a payment platform;
storing, by the credential storage device of the payment platform, the credential information separately and independently from the BSS such that a BSS operator does not have direct access to the credential information;
generating, by the credential storage device of the payment platform, a security token corresponding to the credential information;
sending, by the credential storage device of the payment platform, the security token to a user device;
receiving, to initiate a transaction, by the BSS, an authorization request and the security token corresponding to the credential information from the user device;
storing, by the BSS, the security token;
sending, by the BSS, the authorization request and the security token to a payment gateway of the payment platform;
requesting, by the payment gateway; the credential information corresponding to the authorization request and the security token from the credential storage device;
determining, by the payment gateway, whether an authorization for the transaction is required based on an authorization configured profile associated to the credential information and authorization parameters set by the user; and
based on determining that an authorization for the transaction is not required:
providing, by the credential storage device, an indication to the payment gateway that the authorization for the transaction is not required;
generating, by the payment gateway, a capture request for retrieving funds for the transaction;
sending, by the payment gateway, the capture request to a card issuer corresponding to the credential information; and
transferring, by the payment gateway, the funds for the transaction to an operator of the payment gateway without acquiring authorization.

2. The method of claim 1, wherein the authorization configuration profile comprises at least one authorization parameter, and
wherein the payment gateway is configured to determine whether an authorization for the transaction is required based on the at least one authorization parameter.

3. The method of claim 2, wherein the authorization parameter comprises a card issuer, and
wherein the payment gateway determines that an authorization for the transaction is required based on a card issuer corresponding to the credential information being an inter-company card issuer.

4. The method of claim 2, wherein the authorization parameter comprises a predetermined transaction amount, and
wherein the payment gateway determines that an authorization for the transaction is not required based on an amount for the transaction being less than the predetermined transaction amount.

5. The method of claim 2, wherein the authorization parameter comprises a transaction occurrence frequency, and
wherein the payment gateway determines than an authorization for the transaction is not required based on a transaction occurrence of the transaction being a non-first transaction occurrence.

6. The method of claim 2, wherein the authorization parameter comprises a security token update result, and
wherein the payment gateway determines that an authorization for the transaction is not required based on the security token update result indicating that the security token is not updated.

7. A system for transaction authorization, comprising:
a memory storing instructions, and
at least one processor configured to execute the instructions to:
receive, by a business support system (BSS), credential information of a user;
send, by the BSS, the credential information directly to a credential storage device of a payment platform;
store, by the credential storage device of the payment platform, the credential information separately and independently from the BSS such that a BSS operator does not have direct access to the credential information;
generate, by the credential storage device of the payment platform, a security token corresponding to the credential information;
send, by the credential storage device of the payment platform, the security token to a user device;
receive, to initiate a transaction, by the BSS, an authorization request and the security token corresponding to the credential information from the user device;
store, by the BSS, the security token;
send, by the BSS, the authorization request and the security token to a payment gateway of the payment platform;
request, by the payment gateway; the credential information corresponding to the authorization request and the security token from the credential storage device;
determine, by the payment gateway, whether an authorization for the transaction is required based on an authorization configured profile associated to the credential information and authorization parameters set by the user; and
based on determining that an authorization for the transaction is not required:
provide, by the credential storage device, an indication to the payment gateway that the authorization for the transaction is not required;
generate, by the payment gateway, a capture request for retrieving funds for the transaction;
send, by the payment gateway, the capture request to a card issuer corresponding to the credential information; and
transfer, by the payment gateway, the funds for the transaction to an operator of the payment gateway without acquiring authorization.

8. The system of claim 7, wherein the authorization configuration profile comprises at least one authorization parameter, and
wherein the payment gateway is configured to determine whether an authorization for the transaction is required based on the at least one authorization parameter.

9. The system of claim 8, wherein the authorization parameter comprises a card issuer, and
wherein the payment gateway determines that an authorization for the transaction is required based on a card issuer corresponding to the credential information being an inter-company card issuer.

10. The system of claim 8, wherein the authorization parameter comprises a predetermined transaction amount, and wherein the payment gateway determines that an authorization for the transaction is not required based on an amount for the transaction being less than the predetermined transaction amount.

11. The system of claim 8, wherein the authorization parameter comprises a transaction occurrence frequency, and wherein the payment gateway determines than an authorization for the transaction is not required based on a transaction occurrence of the transaction being a non-first transaction occurrence.

12. The system of claim 8, wherein the authorization parameter comprises a security token update result, and wherein the payment gateway determines that an authorization for the transaction is not required based on the security token update result indicating that the security token is not updated.

13. A non-transitory computer-readable storage medium storing instructions that, when executed by at least one processor, cause the at least one processor to:

receive, by a business support system (BSS), credential information of a user;

send, by the BSS, the credential information directly to a credential storage device of a payment platform;

store, by the credential storage device of the payment platform, the credential information separately and independently from the BSS such that a BSS operator does not have direct access to the credential information;

generate, by the credential storage device of the payment platform, a security token corresponding to the credential information;

send, by the credential storage device of the payment platform, the security token to a user device;

receive, to initiate a transaction, by the BSS, an authorization request and the security token corresponding to the credential information from the user device;

store, by the BSS, the security token;

send, by the BSS, the authorization request and the security token to a payment gateway of the payment platform;

request, by the payment gateway; the credential information corresponding to the authorization request and the security token from the credential storage device;

determine, by the payment gateway, whether an authorization for the transaction is required based on an authorization configured profile associated to the credential information and authorization parameters set by the user; and based on determining that an authorization for the transaction is not required:

provide, by the credential storage device, an indication to the payment gateway that the authorization for the transaction is not required;

generate, by the payment gateway, a capture request for retrieving funds for the transaction;

send, by the payment gateway, the capture request to a card issuer corresponding to the credential information; and transfer, by the payment gateway, the funds for the transaction to an operator of the payment gateway without acquiring authorization.

14. The storage medium of claim 13, wherein, the authorization configuration profile comprises at least one authorization parameter, and wherein the payment gateway is configured to determine whether an authorization for the transaction is required based on the at least one authorization parameter.

\* \* \* \* \*